(12) United States Patent
Turner et al.

(10) Patent No.: US 7,586,659 B2
(45) Date of Patent: Sep. 8, 2009

(54) AUDIO MEMS MIRROR FEEDBACK

(75) Inventors: Arthur Monroe Turner, Allen, TX (US); Varkey George, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 12/355,159

(22) Filed: Jan. 16, 2009

(65) Prior Publication Data
US 2009/0185250 A1    Jul. 23, 2009

Related U.S. Application Data

(60) Provisional application No. 61/022,064, filed on Jan. 18, 2008.

(51) Int. Cl.
*G02B 26/08* (2006.01)
(52) U.S. Cl. .............. 359/199.1; 359/214.1; 359/224.1; 359/900
(58) Field of Classification Search ........................ None
See application file for complete search history.

(56) References Cited

U.S. PATENT DOCUMENTS

| | | | | |
|---|---|---|---|---|
| 5,262,884 | A | * 11/1993 | Buchholz | .................... 398/134 |
| 7,446,921 | B2 | * 11/2008 | Suzuki et al. | ............ 359/224.1 |
| 2005/0218231 | A1 | * 10/2005 | Massieu | ................ 235/472.01 |

* cited by examiner

*Primary Examiner*—James Phan
(74) *Attorney, Agent, or Firm*—William B. Kempler; Wade J. Brady, III; Frederick J. Telecky, Jr.

(57) ABSTRACT

A mirror device and a method for audio feedback of a MEMS mirror device are presented. The mirror device includes a mirror with a reflective surface located to intercept a modulated beam of light produced by a laser. The mirror oscillates on a hinge axis structure A microphone detects the mirror oscillation information. The mirror device further includes a mirror driver system and a video controller system. The mirror driver system causes the mirror to rotate about the hinge axis structure. The video controller system uses the information received from the microphone, and the information received from the mirror-driver controller, to control the output of the laser.

22 Claims, 7 Drawing Sheets

AUDIO MEMS MIRROR FEEDBACK

This application claims the benefit of U.S. Provisional Application No. 61/022,064 filed on Jan. 18, 2008, entitled "MEMS Mirror with Audio Position Feedback," which application is hereby incorporated herein by reference.

TECHNICAL FIELD

The present invention relates generally to a MEMS (micro-electric mechanical systems) mirror and more particularly to an audio feedback system for a MEMS mirror system.

BACKGROUND

Raster scanning is the pattern of image reconstruction used in some optical imaging systems, such as printers, projectors, and other display systems. Raster scanning is the pattern of image storage and transmission used in many bitmap imaging systems. In a raster scan, an image may be divided into a sequence of horizontal scan lines. Each scan line may be transmitted in the form of discrete pixels. When displaying an image, each pixel may be scanned in a scan line across an image plane. After each scan line, the position of the scan line may be advanced, typically downward across the image plane in a process known as vertical scanning, and a next scan line may be transmitted and displayed. This ordering of pixels by rows may be termed raster scan order and may be managed with a video controller.

Micro-mechanical devices or micro-electric mechanical systems (MEMS) are micron-scale devices, often with moving parts, and may be fabricated using traditional semiconductor processes such as optical lithography, metal sputtering, oxide deposition, and plasma etching, which have been developed for the fabrication of integrated circuits.

Micromirrors, such as the DMD™ micromirror array from Texas Instruments, are a type of micro-mechanical device. Other types of micro-mechanical devices include accelerometers, pressure and flow sensors, gears, and motors. Pivoting or oscillating torsional hinged mirrors provide very effective yet inexpensive replacements for spinning polygon shaped mirrors in printers and some types of display systems. As a MEMS mirror oscillates, the resultant reflected beam of light may be scanned onto an image plane. The scan may be a right going scan and then as the mirror changes directions the scan may be a left going scan. Further, other torsional hinged mirrors may act as position indicators, pointer mirrors, or slower speed vertical scan mirrors. Many of these MEMS devices have found wide commercial success.

In many applications, such as the example applications above, it is useful to know the phase, frequency, and/or amplitude of a MEMS mirror. If the phase of the mirror is not known and the left going scanned beam is out of phase with the right going scanned beam, a phenomenon known as "image tearing" may occur in a raster scan. FIG. 1 shows a magnified example of the phenomena. In FIG. 1, image 100 and image 110 show pixels 102 formed from a scanned beam. Each image shows left going rows 114 and right going rows 112. Image 100 shows portions of correctly scanned pixels. Each pixel 102 is in an orthogonal row and column with respect to the adjacent scanned lines. Image 110, however, shows the image tearing effect. In image 110, it can be seen that right going scan line 112 and left going scan line 114 are not in sync, therefore pixels 102 in image 110 do not line up in orthogonal rows. It is obvious that in a larger image this phenomenon may cause "ghosting" and other image distortions.

In some known systems, such as for example, a laser printer system, the needed frequency and phase information from the MEMS mirror oscillations may be provided by optical feedback. The light reflected from the MEMS mirror may be detected by sensors located at or near the photosensitive media of the printer system. The sensors in the printer system may detect the scanning beam as light from the scanning mirror impinges on the printer system sensor. A mirror driver controller may use this information in driving the scanning mirror and coordinating the vertical scan. This system lacks the flexibility a projection optical imaging system may need. It may be impractical in some optical imaging systems or other MEMS systems to place sensors in or near the image plane.

Another method may be to optically sense mirror position within the MEMS device by detecting light reflected from the backside of a MEMS mirror. This method may require additional processing, space in the system, and expense.

Yet another system may be a piezo resistance technique. Using this method, the mirror-hinge structure may have piezo resistive material implanted, or otherwise coupled, into the hinge regions of the mirror structure. The mirror structure may have metal lines that connect the sensor to instrumentation. The metal lines may traverse one or more hinges. Employing this method entails encumbering the mirror/hinge structure with sensors and metal lines. In addition, this method may incur additional processing expense and the potential for early wear out of the part.

As consumer markets drive the optical imaging systems to ever smaller and less expensive designs, a new method of mirror position feedback is needed to fit the confinements of compact MEMS mirror system design, while maintaining a low cost, robust product.

SUMMARY OF THE INVENTION

These and other problems are generally solved or circumvented and technical advantages are generally achieved by the use of an audio feedback system for a MEMS mirror.

In accordance with an illustrative embodiment of the present invention, a MEMS mirror device is presented. The MEMS mirror device includes a mirror with a reflective surface positioned to intercept a modulated beam of light produced by a laser or lasers. The mirror oscillates on a hinge axis structure. A microphone, that is proximate to a tip of the mirror, detects and communicates mirror oscillation information. The MEMS mirror device further includes a mirror driver system and a video controller system. The mirror driver system causes the mirror to rotate about the hinge axis structure. The mirror driver system uses the information, received from the microphone, to find a near-resonant frequency for the oscillating mirror. The video controller system uses the information received from the microphone, and frequency information received from the mirror-driver controller, to control a duty cycle and phase of an output of the laser or lasers.

Advantages of preferred embodiments of the present invention include providing a robust, lower cost, smaller MEMS mirror device.

The foregoing has outlined rather broadly the features and technical advantages of an illustrative embodiment in order that the detailed description of the invention that follows may be better understood. Additional features and advantages of an illustrative embodiment will be described hereinafter, which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the illustrative embodiments as set forth in the appended claims.

BRIEF DESCRIPTION OF THE DRAWINGS

For a more complete understanding of the illustrative embodiments, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the preferred embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that an illustrative embodiment provides many applicable inventive concepts that can be embodied in a wide variety of specific contexts. The specific embodiments discussed are merely illustrative of specific ways to make and use the invention and do not limit the scope of the invention.

The present invention will be described with respect to illustrative embodiments in a specific context, namely a laser projection display system. However, an illustrative embodiment may also be used with other MEMS mirror systems.

Figure 2:
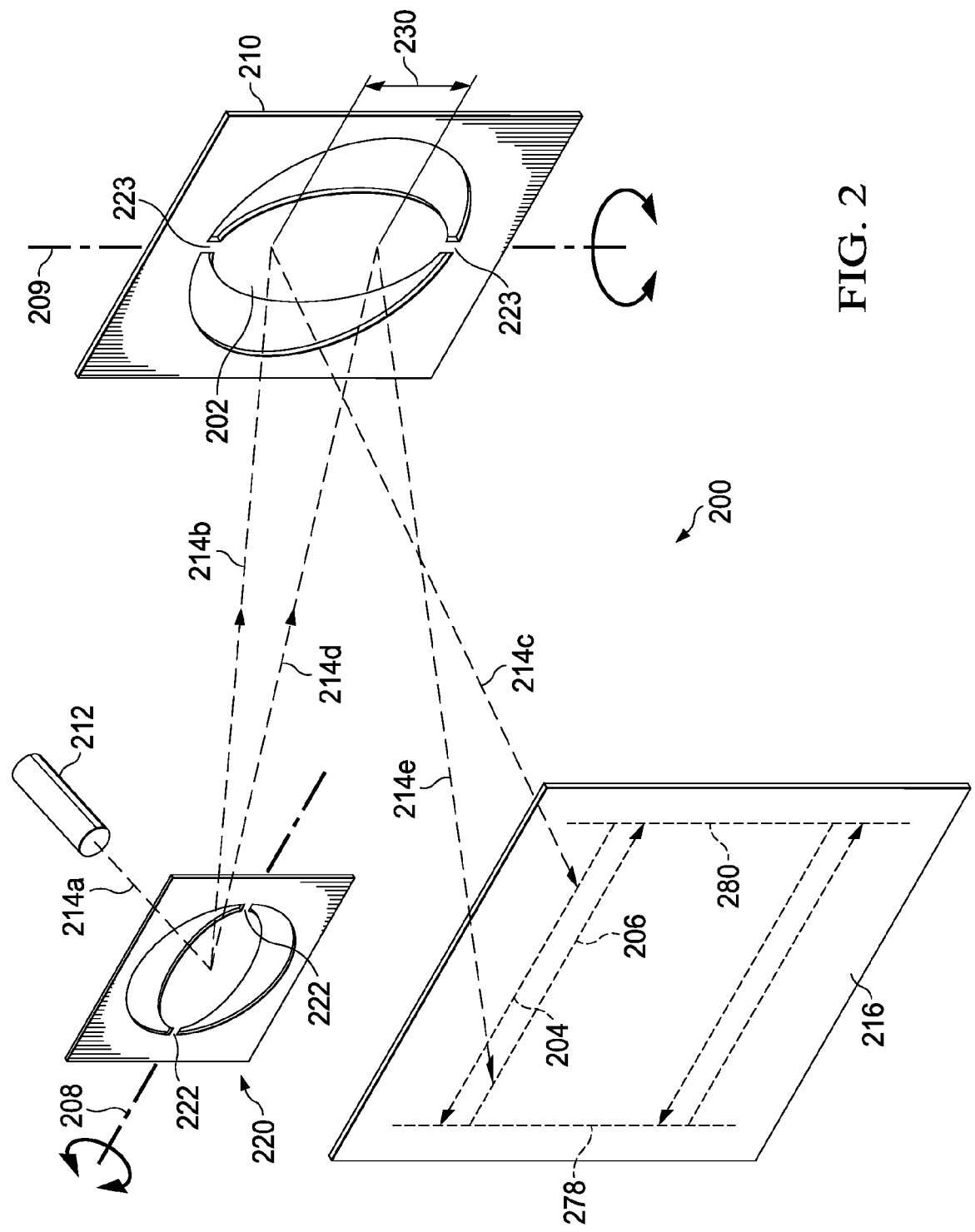
FIG. 2 is a perspective drawing of a dual MEMS mirror system rasting scan lines onto an image plane.

Referring to FIG. 2, a perspective illustration of select portions of an audio feedback MEMS mirror, optical image system 200, is shown. A single axis torsional hinged mirror, such as first mirror 210, may be used in combination with a second single axis torsional hinged mirror, such as second mirror 220, to provide a raster scan to image plane 216. In this example, each mirror has a single axis of rotation 208 and 209, respectively, and a single pair of hinges 222 and 223, respectively. An example configuration employs first mirror 210 as a scanning mirror to provide a high speed scan sweep across image plane 216 and second mirror 220 to provide the orthogonal movement down image plane 216. First mirror 210 may be maintained in or near a resonant state by a mirror driver (not shown). First mirror 210 may be the high speed, scanning mirror used to reflect a light beam quickly and repeatedly across image plane 216.

As was mentioned above, there may also be a need to move the light beam in a direction orthogonal to the resonant oscillation to scan the next line of the image. Therefore, second mirror 220 may be used to provide the vertical or orthogonal movement of the light beam on image plane 216. In other words, the example system of FIG. 2 uses first mirror 210 to provide the right-to-left, and left-to-right beam sweep. However, the up and down or orthogonal control of the beam trajectory is achieved by locating second mirror 220 to intercept light beam 214A emitted from light source 212 and then reflecting intercepted light 214B to first mirror 210, which provides the sweeping motion to resultant beam 214c. Distance indication line 230, shown on mirror surface 202 of first mirror 210, illustrates how second mirror 220 moves light beam 214d down from intercepted light 214B on surface 202 of first mirror 220 between the left-to-right and right-to-left beam sweeps so as to provide parallel lines 204 and 206 on image plane 216. Note that light beam 214e is lower on image plane 216 than resultant beam 214c. There are several other known techniques to provide parallel lines using MEMS mirrors, including multiple axis mirrors and the like. All such techniques are within the scope of the illustrative embodiments.

It should be understood that the term "beam" as used herein does not necessarily mean that the laser light is on or actually providing light. The term is used herein to illustrate the path that would be traced if the light was actually on and a beam of light emitted. As will be appreciated by those skilled in the art, the laser light is typically turned on and off continuously due to modulation, and is typically switched off at two ends 278 and 280 of a scan or sweep. However, the modulation pattern can vary from full on for the complete scan or sweep to full off for the complete scan.

Figure 3:
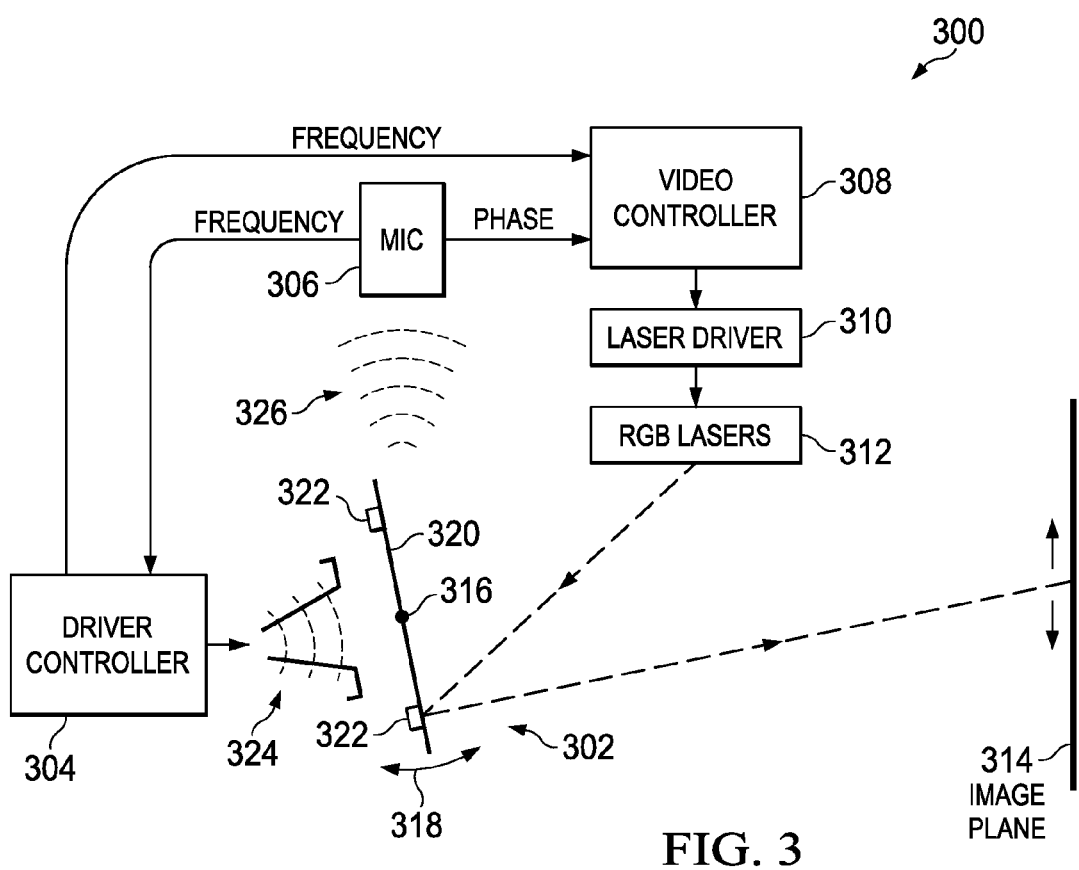
FIG. 3 is a block diagram of select portions of an audio feedback system for a MEMS mirror system.

Turning now to FIG. 3, a block diagram of a portion of an audio feedback system for a MEMS mirror system is shown. The system has the following components: mirror-hinge structure 302, mirror driver controller 304, microphone 306, video controller 308, laser driver 310, and lasers 312. Also shown is image plane 314 of a laser projection display system, which may or may not be a part of MEMS mirror imaging system 300. MEMS mirror imaging system 300 may, of course, have additional components, such as additional mirrors, lenses, and the like, not shown in FIG. 3 for clarity.

Further, microphone 306 may be used to sense other mirrors that are included in MEMS mirror imaging system 300, which is a further advantage of these illustrative embodiments. A microphone, such as microphone 306, may be used for safety interlocks for embodiments of MEMS mirror imaging systems. The microphone may cause the video controller to cease driving the lasers if there is no activity sensed from any mirror systems. In other words, if the microphone does not "hear" either a first mirror or a second mirror, the lasers are shut down, thereby insuring user eye safety.

Mirror 320 oscillates about hinge axis 316 (shown as a dot in this perspective drawing) and the direction of the oscillation is indicated by arcuate arrow 318. The mirror structure oscillates due to, in this embodiment, an electromagnetic core or coil 324, producing torque on mirror-hinge structure 302 by magnetic interaction with mirror-hinge structure permanent magnets 322. As mirror 320 oscillates, pressure waves 326 impinge on microphone 306. Microphone 306 then converts information about pressure waves 326 into electrical signals, such as voltage waveforms, and then communicates these electrical signals to one or both of mirror driver controller 304 and video controller 308. Microphone 306 supplies information that may include the frequency, phase, and amplitude of the oscillations of mirror-hinge structure 302 to mirror drive controller 304 and video controller 308. Mirror driver controller 304 uses the information gathered from microphone 306 to drive mirror-hinge structure 302 near the resonant frequency of the mirror. Video controller 308 uses the information gathered from microphone 306 to inform laser driver 310 as to when to turn lasers 312 on and off in the video stream to raster scan a clear image on image plane 314.

Figure 1:
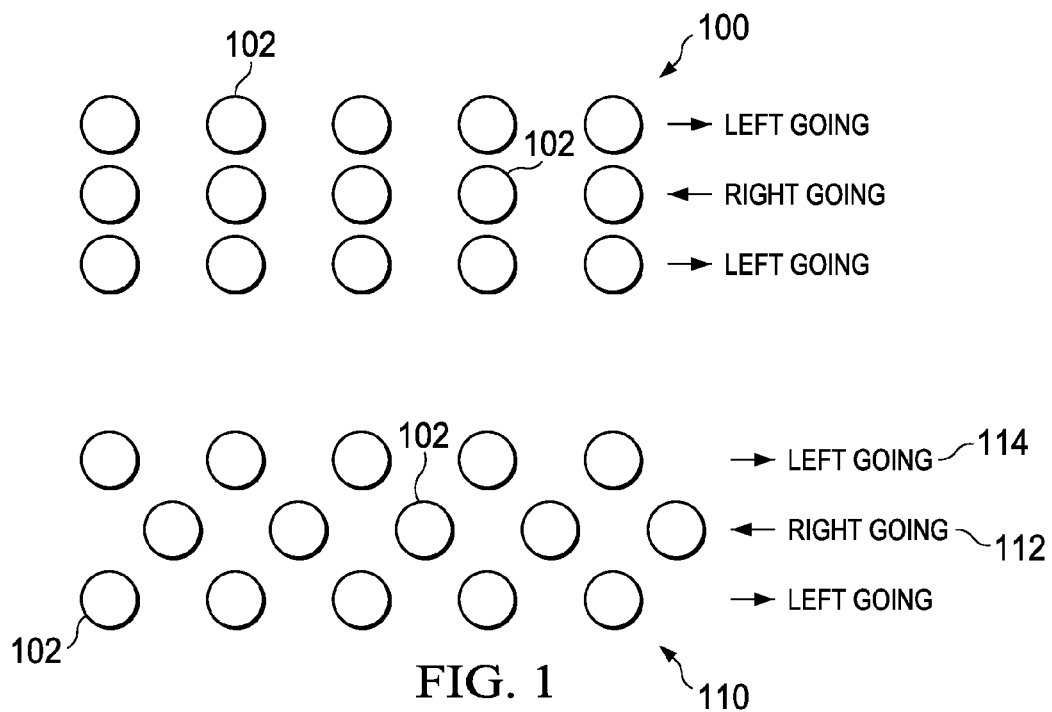
FIG. 1 is a depiction of an image tearing phenomenon.

To produce an image on image plane 314 that is of consistent brightness across image plane 314, the intensity of red, green, and blue (RGB) lasers 312 must be synced with the phase of the mirror-hinge structure. In another embodiment, there may be one laser. In yet another embodiment, there may be a plurality of lasers. The mirror-hinge structure spends proportionally more time pointing to the left and right ends of image plane 314 than to the middle of image plan 314. This is because the light beam scans to an end and then "turns around" and scans to the other end, therefore the light beam spends more time at the ends of image plane 314. Without adjustment of the intensity of RGB lasers 312, an image may appear brighter at the ends of image plane 314 and dimmer in the center. Further, if the video controller is uninformed as to the phase of the mirror as it raster scans the image plane, the scanned image line caused by the left going sweep of the mirror structure may be out of phase with the scanned image line caused by the right going sweep of the mirror structure, leading to an image tearing effect (see FIG. 1).

Figure 4A:
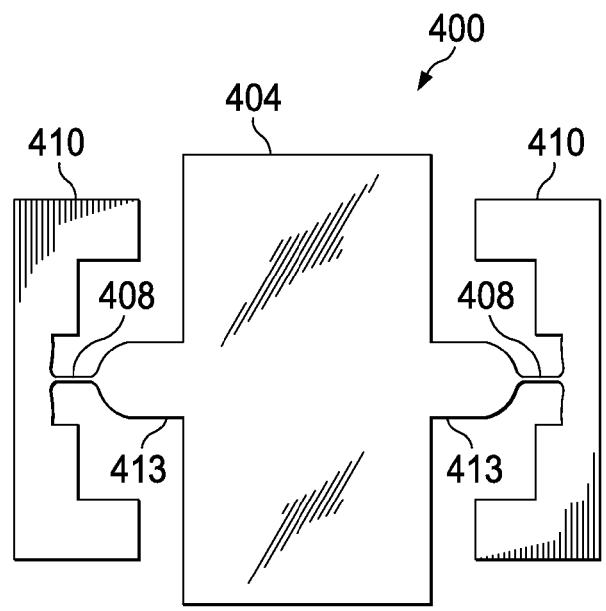
FIGS. 4A and 4B are details of portions of a mirror-hinge structure.
Figure 4B:
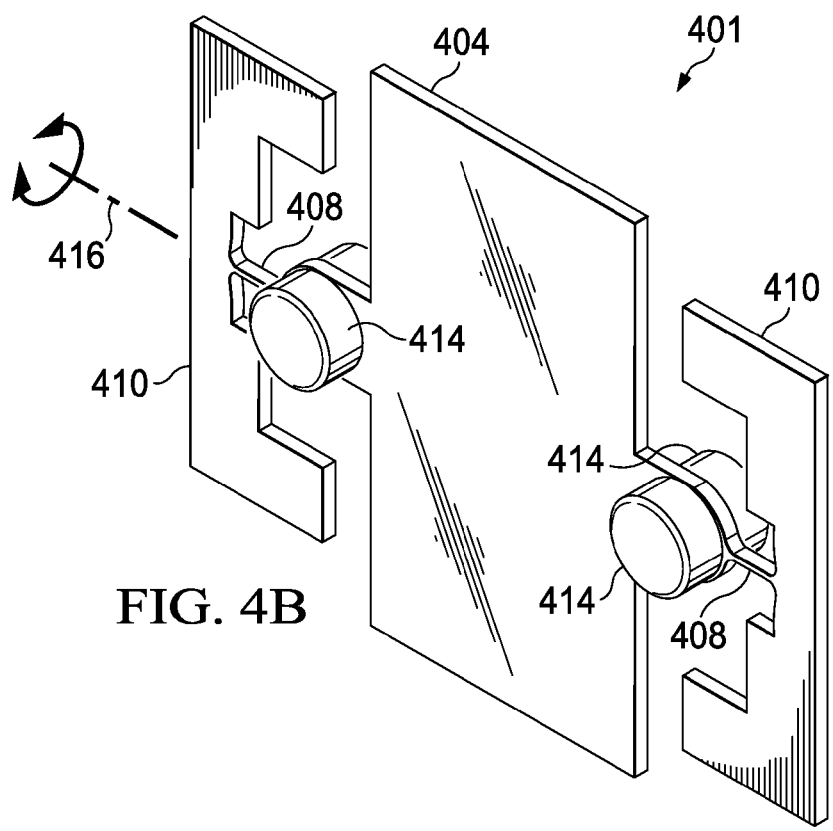

FIGS. 4A and 4B are drawings depicting select components of an example mirror-hinge structure. Those of ordinary skill in the art will appreciate that many types of mirror-hinge configurations may be used within the scope of these embodiments. The shape of the mirror, hinge structure, and mirrors may all be altered within the scope of the illustrative embodiments, for example. Turning to FIG. 4A, a front view of mirror-hinge structure 400 includes mirror 404, drive magnet landings 413, torsional hinges 408, and hinge anchors 410. Mirror-hinge structure 400 may be formed from a single piece of substantially planar material and the functional or moving parts may be etched in the planar sheet of material (such as silicon) by techniques similar to those used in semiconductor art.

FIG. 4B shows a perspective view of mirror subassembly 401. Mirror subassembly 401 includes mirror-hinge structure 400 and drive magnets 414. The perspective view illustrates that mirror 404, torsional hinges 408, and hinge anchors 410 are all of the same thickness. Magnet landings 413 are also of the same thickness (not denoted in FIG. 4B). Note drive magnets 414 comprise two pairs of two magnets with drive magnet 414 mounted on the front and back of the right and left sides of mirror subassembly 401. Torsional hinges 408 are between hinge anchors 410 and drive magnet landings 413. Many other such configurations are within the scope of these illustrative embodiments, such as a single permanent mirror mounted on the backside of the mirror.

Mirror 404 may be on the order of 110-400 microns in thickness, depending on the operating frequency of the mirror, and may be suitably polished on its upper surface to provide a reflective surface. The thickness of mirror 404 may be determined by the requirement that the mirror remain flat with minimum deformation during scanning. In order to provide necessary flatness, mirror 404 may be formed with a radius of curvature greater than approximately 15 meters, depending on the wavelength of light to be reflected. The radius of curvature may be controlled by known stress control techniques, such as by polishing on both the front and backside faces and by implementing deposition techniques for stress controlled thin films. If desired, a coating of suitable material can be placed on the reflective surface to enhance its reflectivity for specific radiation wavelengths.

Torsional hinges 408 are the support for mirror 404. Mirror-hinge structure 400 may be formed from a single piece of substantially planar material and the functional or moving parts may be etched in the planar sheet of material (such as single crystalline silicon) by techniques similar to those used in semiconductor art. In another embodiment, torsional hinges 408 may be made of a single silicon crystal with mirror 404 made of different materials and coupled to mirror-hinge structure 400; however, this method is not likely to be used in a high frequency mirror.

Arcuate arrow 416 indicates the rotational (pivotal) movement of mirror 404. The rotational angle of mirror 404 with respect to a frame may oscillate between, for example, about +/−1 to about 35 degrees. It is the rotational movement, indicated by arcuate arrow 416, which may provide the raster type scan of mirror 404. Thus, hinges 408 may also be termed "scanning axis" and rotational movement indicated by arcuate arrow 416 may also be termed "scanning motion" herein.

A mirror driver controller, such as mirror driver controller 304 in FIG. 3, may be electromagnetic. The electromagnetic mirror driver typically employs a set of permanent drive magnets 414 and at least one driver coil (not shown). The electromagnetic driver system produces electromagnetic forces, which provide the torque that causes mirror 404 to rotate on torsional hinges 408.

Because of the advantageous material properties of single crystalline silicon, a MEMS mirror may have a very sharp torsional resonance. The Q of the torsional resonance typically is in the range of 100 to over 1000. The sharp resonance results in a large mechanical amplification of the scanning motion of a MEMS mirror at a resonance frequency versus a lower or higher frequency. Therefore, according to one illustrative embodiment, it may be advantageous to oscillate the MEMS mirror about the scanning axis near the resonant frequency, thus, reducing the needed drive power. Further, by carefully controlling the dimensions of the hinges (i.e., width, length and thickness), the mirror may be manufactured to have a natural resonant frequency, which is substantially the same as the desired oscillating frequency of the mirror. Thus, by providing a mirror with a resonant frequency substantially equal to the desired oscillating frequency, the power loading may be reduced.

Another advantage to the audio MEMS mirror device is that the microphone may measure and feed back the frequency of the mirror oscillations to the mirror driver controller. The mirror driver controller may then alter the mirror driver output by increments, watching for the change in frequency accompanying the approach of resonant frequency $R_{freq}$. The mirror driver controller may then maintain the MEMS mirror device at a frequency near resonance.

Figure 5:
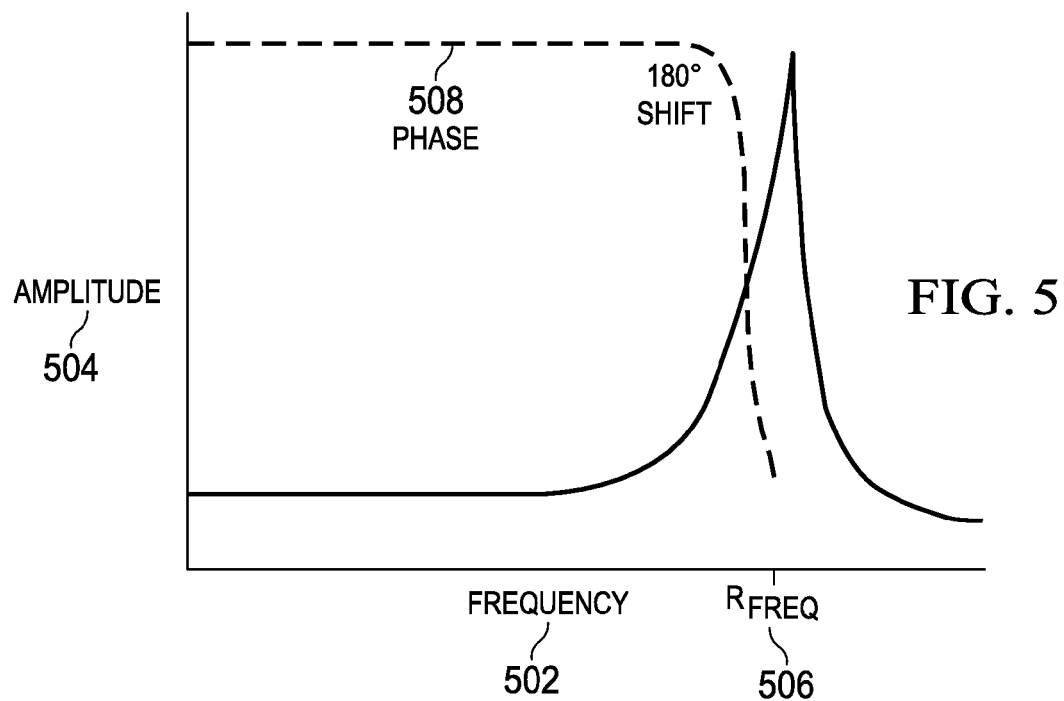
FIG. 5 is a graph of amplitude versus frequency for a MEMS mirror.

Turning to FIG. 5, a graph of mirror oscillation frequency 502 versus mirror amplitude 504 is shown. Mirror amplitude refers to the height the tip of a MEMS mirror reaches, with respect to a frame or support location of the mirror-hinge structure (which is the at-rest position of the mirror), at the maximum of the mirror oscillation. Note that the amplitude of the mirror remains relatively constant until the resonant frequency $R_{freq}$ 506 of the mirror-hinge structure is reached. The amplitude of the mirror oscillation then markedly increases. Further note, that as the mirror frequency reaches $R_{freq}$ 506, phase 508 of the mirror changes rapidly. In fact, the mirror will change phase by 180 degrees over a small frequency change near $R_{freq}$ 506. Thus, it may be optimal to drive a MEMS mirror structure to near resonant frequency to maintain a more stable system, but not precisely to resonant frequency where the system changes radically over minute frequency changes.

Therefore, an advantage of an illustrative embodiment is the microphone feedback to a mirror driver controller, such as mirror driver controller 304 in FIG. 3. The microphone may communicate frequency, phase, and/or amplitude to the mirror driver controller. The mirror driver controller may then determine whether to change output of the mirror driver to run the mirror oscillations closer to, or farther from, the mirror structure resonant frequency. Recall that mirror structure resonant frequency is not static and may change depending on, for example, temperature.

Figure 6:
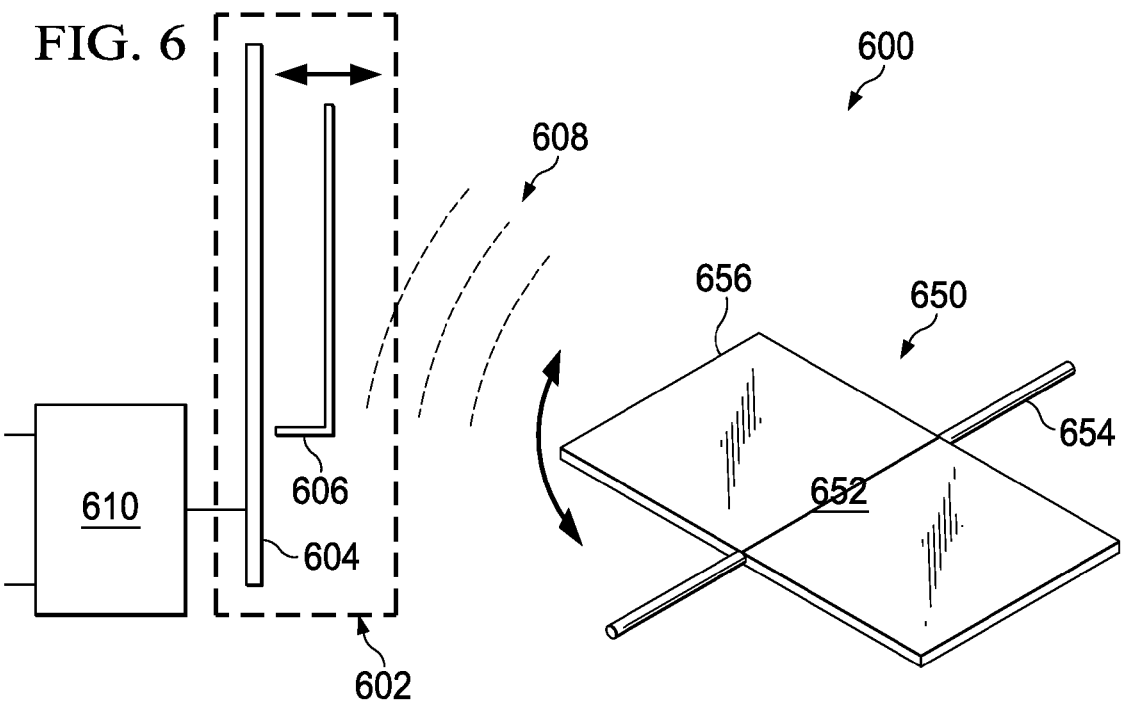
FIG. 6 is a depiction of a MEMS microphone in proximity to a MEMS mirror.

Turning now to FIG. 6, MEMS mirror device 600 is shown. MEMS microphone 602 is shown in proximity to mirror-hinge structure 650. Mirror-hinge structure 650, is a structure such as mirror-hinge structure 302 in FIG. 3 and mirror-hinge structure 400 in FIG. 4. Mirror 652 oscillates about hinge axis 654 producing pressure waves 608.

Microphone 602 may be any type of microphone, for example, condenser, capacitor or electrostatic, electret condenser, dynamic, ribbon, carbon, piezoelectric, laser, and the like. Preferably, a MEMS microphone is employed. In MEMS microphone 602, back plate 604 and diaphragm 606 may be built on the surface of a substrate accompanied by electronics 610, which may be, for example, pre-amplifiers, analog-to-digital converters (ADCs), and the like, as well as electrical connections for power and communication.

During processing of the MEMS microphone, diaphragm 606 is "released" from back plate 604 through chemical etching so it can vibrate freely with incoming pressure waves 608. Diaphragm 606 and back plate 604 form a capacitor with an electrostatic field between back plate 604 and diaphragm 606. Pressure waves 608, in the air (or other intermediary), caused by the movement of mirror tip 656, cause diaphragm 606 to vibrate. The vibration of diaphragm 606 effectively modulates the capacitor. The capacitance change may be amplified and may then be used as an electrical signal or further processed by, for example, an ADC, or other electronics. The changing capacitance of the capacitor formed by back plate 604 and diaphragm 606 may transduce pressure waves 608 into an electrical signal, for example, a voltage waveform.

The basic principles of operation may be the same as for other types of microphones, however, a MEMS microphone may offer inherent advantages, including its size. In a MEMS microphone, a pressure-sensitive diaphragm may be etched directly into silicon substrates by MEMS techniques, and may be accompanied with an integrated preamplifier. Many MEMS microphones are variants of the condenser microphone design. A MEMS microphone may have built in ADC circuits on the same CMOS chip.

Upon initial calibration of an audio MEMS mirror feedback unit, a phase delay between the mirror oscillation and the electrical signal produced by the microphone may be measured. The unit may be adjusted with either a hardware or software offset.

Figure 7:
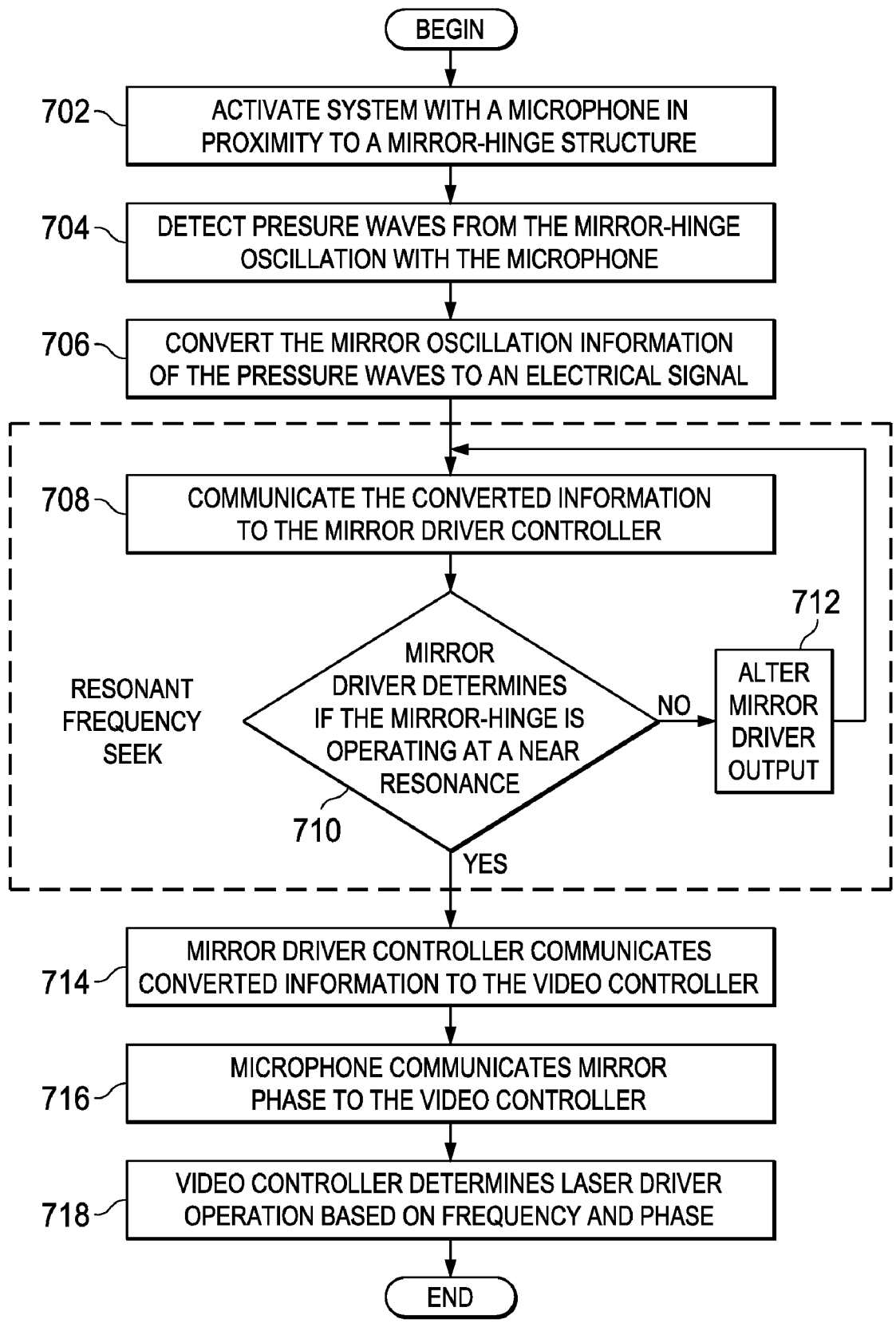
FIG. 7 is a flow chart of a method for audio feedback for a MEMS mirror.

Turning to FIG. 7, a process flow illustrating a method of audio feedback of MEMS mirror position is shown. The process begins as a system with a microphone in proximity to a mirror-hinge structure is activated (step 702). The system is activated by the mirror driver controller at a mirror-hinge frequency stored in a method accessible to the mirror driver controller. The stored mirror-hinge frequency may be the last measured resonant frequency of the system, an inherent resonant frequency of that system at a particular temperature, or the like. The diaphragm of the microphone may be placed less than about 3.5 millimeters from the tip of the oscillating mirror. Preferably, the microphone diaphragm is placed closer, such as, for example, less than 1 millimeter from the mirror tip. If the microphone is placed too far from the tip of the mirror, the pressure waves formed from the oscillations from the mirror may merge or lose definition, thereby diluting or distorting the desired information concerning the mirror oscillation frequency, phase, and amplitude.

The pressure waves from the mirror-hinge oscillations are detected by the microphone (step 704). As described in FIG. 6 above, the diaphragm of the microphone vibrates as the mirror tip pressure waves impinge upon it. The microphone then converts the mirror oscillation information (for example, frequency and phase information) into an electrical signal, for example, a voltage waveform (step 706). The microphone may amplify the signal from the pressure waves and the microphone may convert the pressure wave signal into digital information.

The converted information is communicated to the mirror driver controller (step 708), which uses the frequency information to "seek" the mirror-hinge resonant frequency $R_{freq}$. The mirror driver controller makes a determination as to whether the mirror-hinge structure is oscillating at an optimal near-resonant frequency (step 710). If the mirror-hinge structure is oscillating at near-resonant frequency, the output of the mirror driver remains unaltered and the process continues to step 714. However, if the mirror driver controller determines that the mirror-hinge structure is not oscillating at a near resonant frequency (a NO output of step 710) the mirror driver controller changes the drive frequency of the mirror driver incrementally (step 712) until the near resonance frequency condition is met.

Turning to step 714 (a YES output to step 710), the mirror driver controller communicates mirror frequency to the video controller. The microphone communicates mirror phase to the video controller (step 716). In another embodiment, the amplitude of the mirror tip is also communicated to one or both of the mirror-driver controller and the video controller. The video controller controls the laser driver, which in turn controls the lasers. Thus, the video controller informs the laser as to when to turn on and off (step 718). The video controller uses either the frequency and/or phase of the oscillating mirror to insure that the pixels are delivered at the precise time to the mirror so that the reflected scanned lines are aligned properly on the image plane, thereby minimizing or eliminating the image tear problem and providing a uniformly bright image.

Figure 8A:
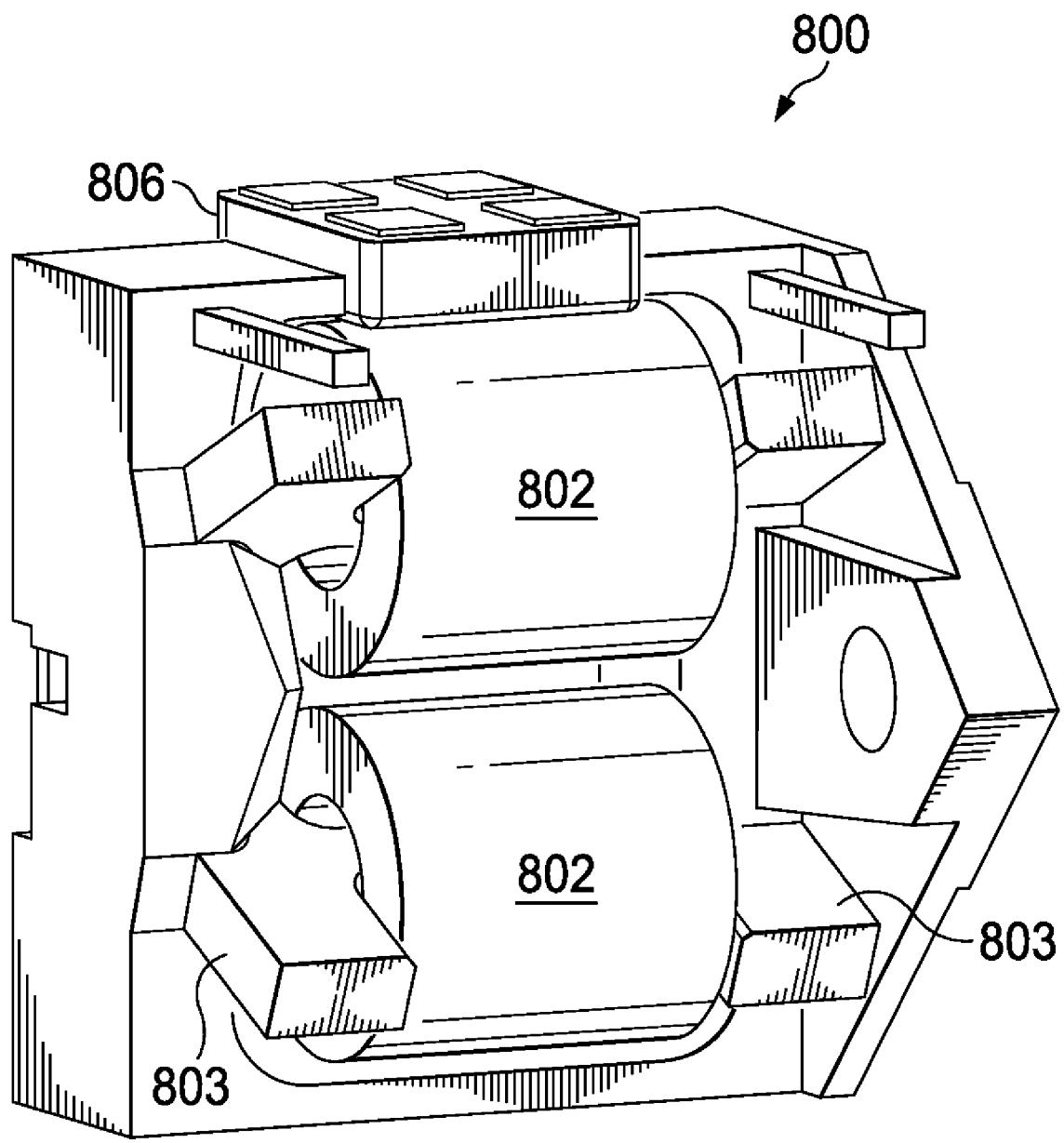
FIG. 8A illustrates a backside view of a MEMS mirror assembly in accordance with an illustrative embodiment.
Figure 8B:
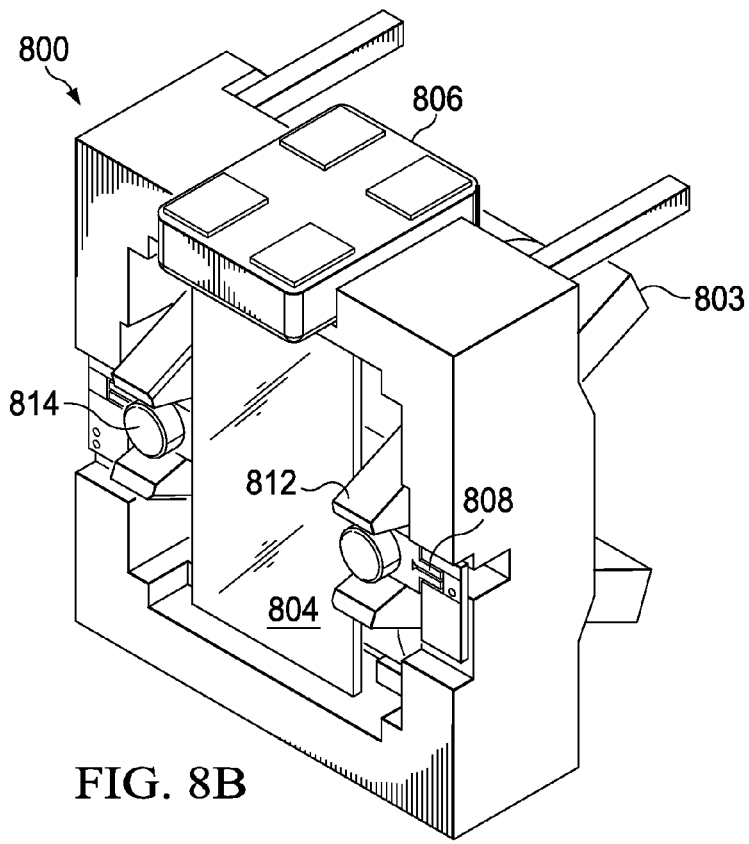
FIG. 8B illustrates a top view of a MEMS mirror assembly in accordance with an illustrative embodiment.
Figure 8C:
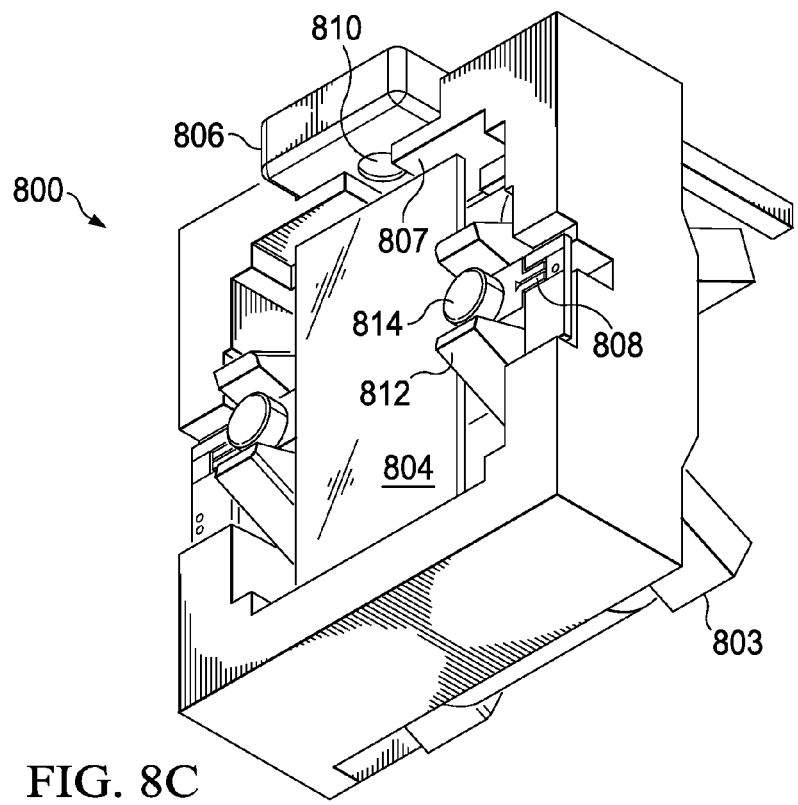
FIG. 8C is an illustration of the MEMS mirror assembly including a microphone window with "visibility" to mirror position, in accordance with an illustrative embodiment.

Turning to FIGS. 8A-8C, views of an audio MEMS mirror feedback unit are shown. FIG. 8A shows the backside of an audio feedback mirror assembly unit. The drive coils 802 used to electromagnetically drive the mirror-hinge structure are located on the backside of unit 800. Core 803 is also shown from the back view. Placing the drive coils directly behind the mirror (not shown in this view) aids in reducing the overall size of unit 800. Microphone casing 806 is placed on the side of unit 800.

Turning to FIG. 8B, a second view of unit 800 is shown. Core 803 may be seen protruding from the backside of unit 800. Core tips 812, extending to the front side of unit 800, are located on either side of permanent magnet sets 814. As an alternating current is applied to core tips 812, the permanent magnets cause attached mirror 804 to rotate about hinges 808. Thus, by energizing the coil with alternating positive and negative voltage at a selected frequency, mirror 804 can be made to oscillate at that frequency. It should be appreciated to one skilled in the art that there are many combinations of drive mechanisms for the mirror-hinge structure within the scope of these embodiments. The mirror mechanical motion in the scan axis is typically greater than 15 degrees and may be as great as 35 degrees, for example. Microphone casing 806 is shown coupled to the side of unit 800.

FIG. 8C shows a front view of the system. Mirror 804 is shown connected to hinges 808 with magnet sets 814 between mirror 804 and hinges 808. Core tips 812 are shown on both sides of magnet sets 814. Microphone casing 806 is shown on the side of unit 800. Within microphone casing 806 is mirror visibility window 810. Further, gap 807 is shown in the casing of unit 800. Mirror visibility window 810 and gap 807 provide the pressure waves (not shown), produced when mirror 804 oscillates, access to the microphone diaphragm (not shown).

In another embodiment, another unit similar to unit 800 may be coupled to microphone casing 806, supplied with a mirror visibility window and a gap, thereby allowing the microphone to sense a plurality of additional mirror-hinge structures.

In yet another embodiment, inertial drive methods for producing movement about the scan axis are used. Inertial drive involves applying a small rotational motion at or near the resonant frequency of the mirror to the whole silicon structure, which then excites the mirror to resonantly pivot or oscillate about its torsional axis. In this type of drive, a very small motion of the whole silicon structure can excite a very large rotational motion of the mirror.

In yet other embodiments, other drive circuits for causing pivoting of the mirror around single-axis hinge structures may be employed. These drive sources include piezoelectric and electrostatic drive circuits. Piezoelectric and electrostatic drive circuits have been found to be especially suitable for generating the resonant oscillation for producing the back and forth beam sweep.

Although the illustrative embodiment and its advantages have been described in detail, it should be understood that various changes, substitutions, and alterations can be made herein without departing from the spirit and scope of the invention as defined by the appended claims. For example, many of the features and functions discussed above can be implemented in software, hardware, or firmware, or a combination thereof. As another example, it will be readily understood by those skilled in the art that geometries may be varied while remaining within the scope of the present invention.

Moreover, the scope of the present application is not intended to be limited to the particular embodiments of the process, machine, manufacture, composition of matter, means, methods, and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A mirror device comprising:
   a mirror with a reflective surface positioned to intercept a modulated beam of light produced by at least one laser;
   a hinge axis structure for oscillating the mirror;
   a microphone proximate to the mirror, wherein the microphone detects a first information related to at least one of a frequency, and/or a phase of an oscillation of the mirror;
   a mirror driver system that causes the mirror to rotate about the hinge axis structure, wherein the mirror driver system receives the first information from the microphone; and
   a video controller system, wherein the video controller system controls a duty cycle, and phase of an output of the at least one laser.

2. The device of claim 1, wherein the first information relates at least to a frequency of the oscillation of the mirror, and wherein the mirror driver system employs the first information to drive the mirror to a near resonant frequency.

3. The device of claim 1, wherein the mirror driver system informs the video controller of the first information.

4. The device of claim 1, wherein the first information relates at least to a phase of the oscillation of the mirror.

5. The device of claim 4, wherein the microphone informs the video controller system of the first information.

6. The device of claim 1 further comprising:
   a second information, wherein the microphone detects the second information, and wherein the second information relates to an amplitude of the oscillation of the mirror, and wherein the microphone informs the video controller system of the second information.

7. The device of claim 1, wherein the microphone comprises a MEMS microphone.

8. The device of claim 1, wherein a diaphragm of the microphone is located less than about 3 millimeters from a mirror tip.

9. The device of claim 1, wherein a diaphragm of the microphone is located less than about 1 millimeter from a mirror tip.

10. The device of claim 1, wherein the mirror driver system is electromagnetic.

11. The device of claim 1, wherein the hinge axis structure oscillating the mirror comprises a multiple axis hinge structure.

12. The device of claim 11, wherein a plurality of microphones is coupled to the mirror.

13. The device of claim 1, wherein the microphone is coupled to a plurality of mirrors.

14. The device of claim 1, wherein the mirror is a MEMS mirror.

15. A method of monitoring a mirror, the method comprising:
   locating a microphone in proximity to the mirror;
   detecting with the microphone pressure waves caused by a movement of the mirror;
   converting the pressure waves to an electrical signal wherein the electrical signal contains information related to at least one oscillation parameter of the mirror;
   communicating the at least one oscillation parameter of the mirror to a mirror driver controller, and/or a video controller; and
   outputting a controller signal from the mirror driver controller, and/or the video controller, the controller signal based on the at least one oscillation parameter of the mirror.

16. The method of claim 15, wherein the mirror comprises a MEMS mirror.

17. The method of claim 15, wherein the microphone comprises a MEMS microphone.

18. The method of claim 15, wherein the mirror is less than about 3 millimeters from a diaphragm of the microphone.

19. The method of claim 15, wherein the mirror is less than about 1 millimeter from a diaphragm of the microphone.

20. The method of claim 15, wherein the at least one oscillation parameter of the mirror is at least one of frequency, phase, and amplitude of the mirror oscillations.

21. The method of claim 15 further comprising:
    detecting the at least one oscillation parameter from a second mirror; and
    communicating the at least one oscillation parameter from the second mirror to the video controller.

22. A mirror device comprising:
    a light source;
    a MEMS mirror located to reflect the light source;
    a MEMS microphone, wherein the MEMS microphone is located less than about 2 millimeters from the MEMS mirror;
    a mirror driver controller in communication with the MEMS microphone, wherein the mirror driver controller drives the MEMS mirror to a near resonant frequency; and
    a video controller in communication with the mirror driver controller and the MEMS microphone, wherein the video controller controls an output of the light source.

* * * * *